United States Patent
Bidner et al.

(10) Patent No.: US 9,103,286 B2
(45) Date of Patent: Aug. 11, 2015

(54) METHOD AND SYSTEM FOR ENGINE CONTROL

(71) Applicant: Ford Global Technologies, LLC, Dearborn, MN (US)

(72) Inventors: David Karl Bidner, Livonia, MI (US); Ross Dykstra Pursifull, Dearborn, MI (US); Gopichandra Surnilla, West Bloomfield, MI (US); Mark Allen Dearth, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 298 days.

(21) Appl. No.: 13/743,237

(22) Filed: Jan. 16, 2013

(65) Prior Publication Data

US 2014/0200796 A1  Jul. 17, 2014

(51) Int. Cl.
*F02D 19/12* (2006.01)
*F02M 25/03* (2006.01)

(52) U.S. Cl.
CPC ................ *F02D 19/12* (2013.01); *F02M 25/03* (2013.01); *Y02T 10/121* (2013.01)

(58) Field of Classification Search
CPC ......... F02D 19/12; F02D 19/00; F02B 47/00; F02B 47/02; F02B 47/04
USPC ............................... 701/111; 123/25 A–25 H
See application file for complete search history.

(56) References Cited

U.S. PATENT DOCUMENTS

| | | | |
|---|---|---|---|
| 3,696,042 A * | 10/1972 | Wright et al. | 134/32 |
| 4,130,145 A * | 12/1978 | Thomas, Jr. | 141/88 |
| 4,880,848 A | 11/1989 | Ghali | |
| 5,199,386 A | 4/1993 | Hubbard | |
| 2010/0121559 A1* | 5/2010 | Bromberg et al. | 701/111 |
| 2012/0029795 A1 | 2/2012 | Surnilla et al. | |

* cited by examiner

*Primary Examiner* — Stephen K Cronin
*Assistant Examiner* — Xiao Mo
(74) *Attorney, Agent, or Firm* — Julia Voutyras; Alleman Hall McCoy Russell & Tuttle LLP (57) ABSTRACT

Methods and systems are provided for use of a windshield wiper fluid having a reformulated composition including one or more non-ionic surfactants. The fluid is delivered to the windshield in response to an operator demand for wiping the windshield. The same fluid is also delivered to a cylinder in response to an indication of abnormal cylinder combustion.

17 Claims, 3 Drawing Sheets

METHOD AND SYSTEM FOR ENGINE CONTROL

FIELD

The present application relates to methods and systems for using washer fluid to mitigate detonation in an internal combustion engine.

BACKGROUND AND SUMMARY

Knock control fluids have been developed to mitigate various abnormal combustion events in engine cylinders. For example, various combinations of gasoline, ethanol, methanol, other alcohols, water, washer fluid, and other inert fluids may be direct injected into an engine cylinder in response to an indication of untimely detonation.

One example approach for injecting a knock control fluid to mitigate cylinder abnormal combustion is shown by Surnilla et al in US 2012/029795. Therein, knock is addressed using one or more of spark retard (until a threshold point) and direct injection of a knock control fluid. The threshold point beyond which less spark retard and more knock fluid injection is used may be adjusted based on operating conditions and various cost functions (such as exhaust emissions, fuel economy, cost of operation, engine performance, etc.).

However the inventors herein have recognized that there may be potential issues associated with the use of the available knock control fluids. Specifically, the presence of ionic materials in existing knock control fluids can degrade engine performance. For example, a washer fluid (that includes a water-alcohol mixture) may be directly injected into the combustion chamber responsive to provide a desired amount of engine dilution to address engine knock. However, ionic materials typically introduced into the washer fluid by the addition of ionic surfactants (e.g., in the form of counter ions such as $Ca^{2+}$, $Na^+$, $K^+$, $Li^+$, etc.) can have an adverse impact on combustion chamber deposits, catalytic after-treatment materials, and exhaust system components. In addition, the washer fluid components can cause the release of unintended pollutants into the vehicle exhaust. While the ionic surfactants are added in low concentration to washer fluid, they are required in the fluid composition to both lubricate the wiper blades and to enhance the removal of foreign material from the surface of the windshield. Further, the ionic components are needed to buffer the washer fluid and to aid in the ionization and agglomeration of dirt particles during application of the washer fluid on the windshield.

Thus, in one example, the above issues may be at least partly addressed by a method for an engine comprising: in response to knock, direct injecting a fluid including one or more non-ionic surfactants into a cylinder from a reservoir coupled to a direct injector; and in response to operator demand, delivering the (knock control) fluid from the reservoir to a vehicle windshield. In this way, the windshield wiper fluid may meet wiping demands while also controlling knock, without degrading engine performance.

In one example, a windshield wiper fluid may be reformulated to include one or more non-ionic surfactants. The reformulation allows ionic materials, particularly alkaline and reactive materials, to be excluded from the windshield wiper fluid. The fluid may be stored in a reservoir (e.g., a secondary reservoir) coupled to a cylinder direct injector. In response to an operator demand for windshield wiping, the fluid may be delivered from the reservoir to the windshield. By replacing the reactive components of the fluid with organic buffers and non-ionic components, the critical washer fluid properties can be retained, allowing the wiper fluid to retain its wiping function. In response to an indication of cylinder knock, the same fluid may also be delivered to the cylinder. For example, the fluid may be direct injected to increase engine dilution and reduce knock. By replacing the ionic components of the fluid with non-ionic components, the risk of contamination of the combustion chamber and exhaust system with aggressive and recalcitrant metal salts is reduced. This allows engine performance to be improved and the life of exhaust components to be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
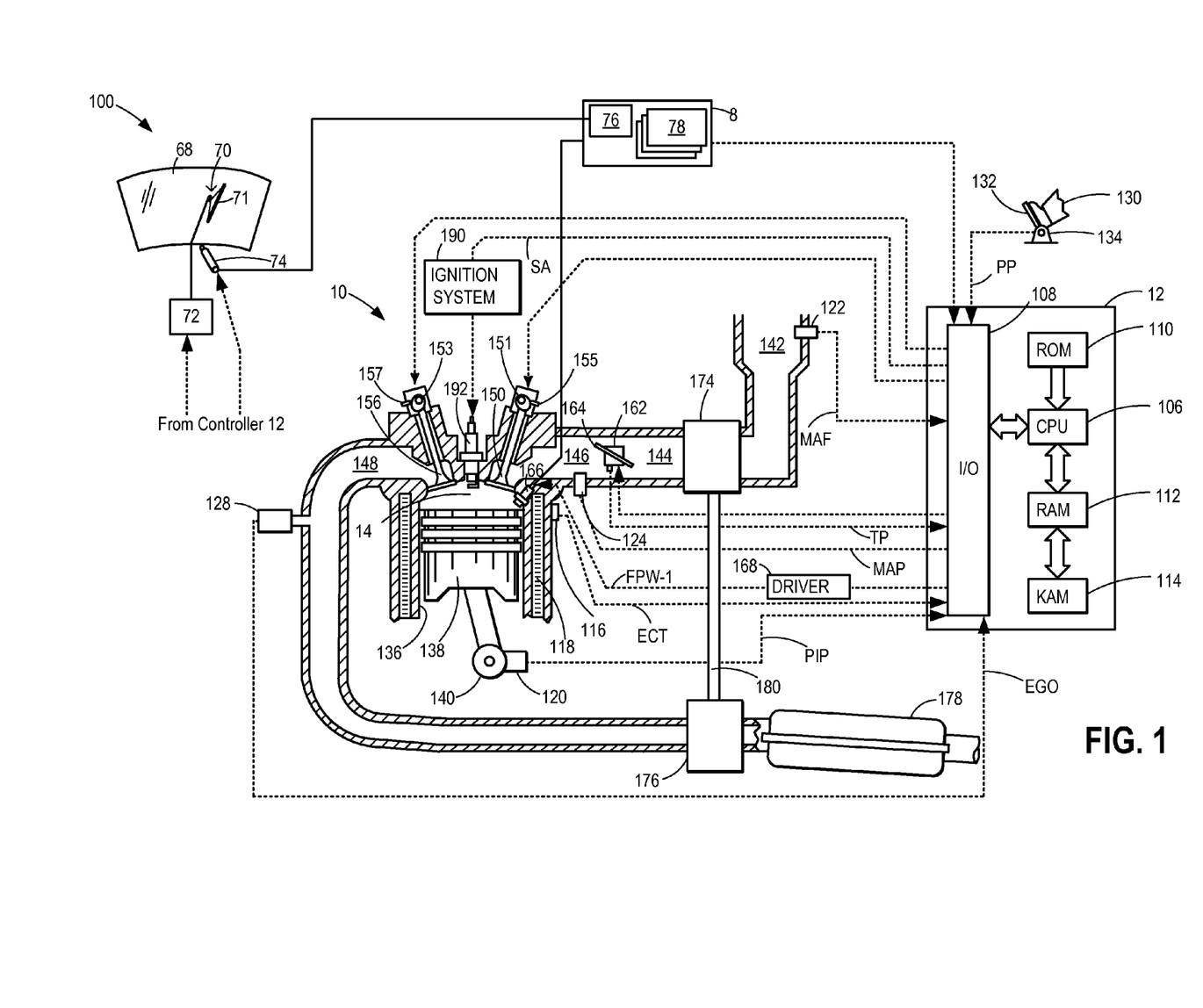
FIG. 1 shows an example embodiment of a vehicle system including a reservoir for storing a reformulated windshield wiper fluid.

The following description relates to systems and methods for addressing knock control while also meeting windshield wiping demands in a vehicle, such as the vehicle system of FIG. 1. In response to an operator requesting windshield wiping, a reformulated wiper fluid including various non-ionic components may be delivered from a reservoir to the windshield. Further, in response to an indication of cylinder knock, the fluid may also be direct injected into the affected cylinder. An engine controller may be configured to perform a control routine, such as the routine of FIG. 2, to deliver the wiper fluid from the storage reservoir to one or more of the windshield and the combustion chamber based on operator demands and engine operating conditions. Example windshield wiper fluid delivery systems are depicted at FIGS. 3A-B. By using a fluid with non-ionic components, wiping demands can be met without degrading or corroding engine components.

FIG. 1 depicts an example vehicle system 100 including an internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Vehicle system 100 includes a windshield wiper system that enables cleaning of a vehicle windshield 68. Windshield 68 may be a front or rear windshield of a vehicle. The windshield wiper system includes at least one windshield wiper 70 operated by wiper motor 72. In response to an operator demand, and based on input from controller 12, wiper motor 72 may be energized causing wiper 70 to make multiple sweeping cycles known as wipes or sweeps over windshield 68. The wipes or sweeps enable wiper blade 71 to remove moisture, debris, and foreign particles from the surface of windshield 68. While operating wiper motor 72 and while wiper blade 71 is sweeping, based on request from a vehicle operator, controller 12 may intermittently inject or squirt a wiper fluid onto the windshield via wiper injector 74. Wiper fluid may be stored in a reservoir 76 from where it is delivered to the windshield. As elaborated herein, reservoir 76 may be included in a fuel system, coupled to a direct injector of the cylinder. This allows the wiper fluid to be direct injected to provide knock control in addition to being used for windshield wiping purposes.

The wiper fluid stored in reservoir 76 may include a combination of water and alcohol and one or more non-ionic surfactants. These may include, for example, ethoxylates, poly-alcohols, or a combination thereof. In general, these may be molecules with hydrophilic side-chains. The hydrophilic side-chains may include polyethylene oxide side-chains or a combination of polyethylene and polypropylene oxide side-chains. Non-limiting examples include Nonoxynol-9 and Triton X-100. As a result, the wiper fluid stored in reservoir 76 may be a non-electrolytic, non-corrosive aqueous fluid. As such, conventional wiper fluids may include various ionic components, including some highly alkaline and highly reactive metals. The ionic materials may be introduced in the fluid through the addition of ionic surfactants in the form of counter ions such as $Ca^{2+}$, $Na^+$, $K^+$, $Li^+$, etc. When included, the ionic surfactants are added in low concentration to washer fluid to both lubricate windshield wiper blade 71 and to enhance the removal of foreign material from the surface of windshield 68. In addition, the ionic components buffer the washer fluid and aid in the ionization and agglomeration of dirt particles during application of the washer fluid on windshield 68. However, when direct injected into the cylinder for knock control, the ionic components can have an adverse impact on combustion chamber deposits, catalytic after-treatment materials, and exhaust system components. In addition, the ionic washer fluid components can cause the release of unintended pollutants into the vehicle exhaust. The inventors have recognized that by replacing the reactive components of the wiper fluid with organic buffers and non-ionic components, the critical washer fluid properties can be retained, allowing the wiper fluid to retain its ability to lubricate wiper blade 71 and clean windshield 68. In addition, when direct injected into a cylinder for knock control, the use of non-ionic components in the wiper fluid reduces the risk of contamination of the combustion chamber and exhaust system with aggressive and recalcitrant metal salts.

In some embodiments, as elaborated with reference to FIGS. 3A-B, the windshield wiper system may also include an aspirator. For example, an aspirator may be coupled between reservoir 76 and injector 74. In those embodiments, when delivering the fluid from the reservoir to the vehicle windshield, the fluid may flow from the reservoir to the windshield through the aspirator. Vacuum generated via the fluid flow may then be drawn at the neck of the aspirator and stored in a vacuum reservoir for later use.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. As elaborated with reference to FIGS. 6 and 12, a cam timing may be adjusted (by advancing or retarding the VCT system) to adjust an engine dilution in coordination with an EGR flow and/or a direct injection of a knock control fluid, thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock control fluid thereto. In some embodiments, the knock control fluid may be a fuel, wherein the injector is also referred to as a fuel injector. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including one or more fuel tanks 78, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, fuel tanks 78 may have a pressure transducer providing a signal to controller 12. It will be appreciated that, in an alternate embodiment, injector 166 may be a port injector providing fuel into the intake port upstream of cylinder 14.

It will also be appreciated that while in one embodiment, the engine may be operated by injecting the variable fuel or knock control fluid blend via a single direct injector; in alternate embodiments, the engine may be operated by using two injectors (a direct injector 166 and a port injector) and varying a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as air-charge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks 78 in fuel system 8 may hold fuel or knock control fluids with different qualities, such as different compositions. These differences may include different alcohol content, different water content, different octane, different heat of vaporizations, different fuel blends, different water contents, different flammability limits, and/or combinations thereof etc. In one example, knock control fluids with different alcohol contents could include one fuel being gasoline and the other being ethanol or methanol. Other alcohol containing fuels could be a mixture of alcohol and water, a mixture of alcohol, water, etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of the fuel or knock control fluid stored in the fuel tank may vary frequently. The day to day variations in tank refilling can thus result in frequently varying fuel compositions, thereby affecting the fuel composition delivered by injector 166.

In addition to the fuel tanks, fuel system 8 may also include a reservoir 76 for storing a windshield wiper fluid. While reservoir 76 is depicted as being distinct from the one or more fuel tanks 78, it will be appreciated that in alternate examples, reservoir 76 may be one of the one of more fuel tanks 78. Reservoir 76 may be coupled to direct injector 166 so that wiper fluid can be directly injected into cylinder 14. As elaborated with reference to the routine of FIG. 2, during some conditions, in response to an indication of knock, an engine controller may directly inject wiper fluid into the cylinder to increase engine dilution and thereby control the untimely and unwanted detonation event. As discussed above, the wiper fluid stored in reservoir 76 may be formulated to include a combination of water and alcohol and one or more non-ionic surfactants such as 40% methanol. These non-ionic components allow the washer fluid to retain windshield cleaning properties while reducing the risk of contaminating and corroding the combustion chamber and exhaust system with aggressive and recalcitrant metal salts.

Example compositions of the reformulated wiper fluid that may be used for windshield wiping as well as knock control include ethanol and methanol solutions without soap.

In some embodiments, the wiper fluid may be generated on board the vehicle from exhaust condensate, charge air cooler condensate, AC condensate drain, or rainwater drain. For example, both the water and the alcohol in the wiper fluid composition may be self generated from water drained from the exhaust, charge air cooler, AC and/or rainwater drain, and alcohol separated from fuel in the fuel tank. By self generating the components of the wiper fluid, the number of consumables on the vehicle system may be reduced.

Self-generating the wiper fluid may also include adding or removing components to or from an aqueous liquid to generate a wiper fluid of a desired composition. As an example, reservoir 76 may be a first reservoir and the fluid may be a first aqueous liquid, and the engine system may further include a second reservoir coupled to the first reservoir, the second reservoir storing a second surfactant-free aqueous liquid. When wiper fluid is required, the controller may mix the second surfactant-free liquid from the second reservoir with one or more surfactants (stored in another reservoir) to generate the first fluid stored in the first reservoir. In an alternate example, the second reservoir may store a second aqueous liquid, wherein the controller may remove (or add) an electrolyte from the second aqueous liquid to generate the first aqueous liquid.

In still further embodiments, the wiper fluid may be generated or modified in situ before delivering to the windshield or the cylinder. As an example, when delivering the fluid from the reservoir to the knock-affected cylinder, the controller may mix the fluid with a lubricant before the direct injection. By adding a lubricant to fluid headed to the engine, valve recession at high load or high engine speed conditions can be reduced. In alternate examples, the valve lubricant may be added to the fuel, such as using dosing systems. This may be particularly advantageous when operating an engine with alternate fuels such as CNG, LPG, or E85. In another example, when delivering the fluid from the reservoir to the vehicle windshield, the controller may mix the fluid with a non-ionic surfactant before delivering. Herein, the controller may add the surfactant or soap to the alcohol solution for windshield cleaning before delivering the solution to the windshield wiper nozzle. Likewise, the controller may add a valve lubricant (e.g., a metered amount of valve lubricant) to the gaseous solution for gaseous fuel usage before delivering the solution to the direct injector. This approach reduces the need for a separate dosing system. Further, the same in-cylinder coolant also becomes a valve-recession retarder.

For example, reservoir 76 storing the non-ionic aqueous windshield wiper solution may be a first reservoir, and a second reservoir (not shown) storing the lubricant may be coupled to the first reservoir. In response to an indication of valve recession, an engine controller may mix a metered amount of the lubricant from the second reservoir with the fluid in the first reservoir before direct injecting the mixture into the cylinder. The metered amount of lubricant added to the fluid may be based on a degree of cylinder valve recession. As such, this allows a valve recession retardant dosing system to be provided using the existing components of the wiper system.

As such, valve recession issues may be experienced more frequently on the intake valve. This can be due to the higher acceleration rates and mass experienced at the intake valve relative to the exhaust valve, in practice. Thus, while the above example suggests direct injecting the mixture of wiper fluid with lubricant, in other examples, when injecting a lubricant for addressing knock and valve recession while operating the engine with a gaseous fuel (such as CNG), intake port fuel injection may be used. That is, the metered amount of lubricant may be mixed with the fluid before port injecting the mixture into the cylinder. While the above examples suggest adding the lubricant or surfactant to the fluid including the one or more non-ionic surfactants before delivery, in still further embodiments, the lubricant and/or the one or more non-ionic surfactants may be added to a surfactant-free version of the fluid before delivery so that a wiper fluid of the appropriate composition is made in situ and appropriately delivered to the windshield or cylinder.

In some embodiments, the windshield wiper fluid may be mixed with one or more ionic components to address windshield deicing. For example, reservoir 76 storing the non-ionic aqueous windshield wiper solution may be a first reservoir, and a second reservoir (not shown) storing an ionic aqueous solution may be coupled to the first reservoir. In response to an operator request for windshield de-icing, an engine controller may mix an amount of the ionic aqueous solution with the fluid in the first reservoir, and delivering the mixture to the windshield.

Example embodiments of the wiper system and the fuel system of vehicle system 100 are shown at FIGS. 3A-B. Specifically, example configurations of the various components of the wiper system and the fuel system that can be used to deliver wiper fluid (with non-ionic surfactants and/or lubricant added therein) to each of the vehicle windshield and a knock-affected cylinder are shown.

FIG. 3A shows a first embodiment 300 wherein reservoir 302 stores a (base) wiper fluid solution which essentially includes a non-flammable combination of water and alcohol (and optionally one or more non-ionic surfactants). Reservoir 302 may be filled with the wiper fluid via filler neck 304. In response to an operator demand for windshield wiping, pump 306 may be operated to deliver the base wiper fluid solution from reservoir 302 to a windshield wiper nozzle. A concentrated solution of one or more ionic surfactants (or soaps) to be used with the water-alcohol solution may be stored in auxiliary reservoir 310. In response to the operator demand for windshield wiping, an amount (e.g., a metered amount) of surfactant solution may be delivered from auxiliary reservoir 310 via aspirator 312, and mixed with the pumped water-alcohol wiper solution. The mixture may then be delivered to the windshield wiper nozzle. Likewise, in response to a cylinder knocking event, pump 308 may be operated to deliver an amount of the wiper fluid solution into an engine cylinder (via the direct injection system) to address the knock.

FIG. 3B shows an alternate embodiment 350 wherein, responsive to an operator demand, pump 306 is operated to deliver a non-flammable alcohol containing wiper fluid solution from reservoir 302 to a windshield wiper nozzle after mixing an amount of non-ionic surfactant therein. The non-ionic surfactant is delivered from auxiliary reservoir 310 via aspirator 312. Upon mixing, the in situ generated windshield wiping mixture is delivered to the windshield wiper nozzle. Likewise, responsive to a cylinder knocking event, pump 308 is operated to deliver an amount of the wiper fluid solution into an engine cylinder after mixing with an amount of valve lubricant. Specifically, in response to cylinder knock, an amount (e.g., a metered amount) of lubricant may be delivered from auxiliary reservoir 320 via aspirator 322, and mixed with the pumped water-alcohol wiper solution. The mixture may then be delivered to the affected cylinder via a direct injector coupled to the cylinder or a port injector coupled to the cylinder. In one example, the mixture may be delivered to the cylinder via direct injection when the cylinder is operated with a liquid fuel (such as gasoline or E85) while the mixture is delivered to the cylinder via port injection when the cylinder is operated with a gaseous fuel (such as CNG or LPG). The embodiment of FIG. 3B provides various advantages. First, the need for a separate dosing system is reduced. Further, the same in-cylinder coolant also becomes a valve-recession retarder.

Returning to FIG. 1, in some embodiments, the fuel system may include a reservoir for storing water that is coupled to the direct injector so that water may be direct injected into the cylinder. As such, by injecting water, "liquid EGR" is provided, which enables substantial EGR benefits to be achieved. However, during conditions when liquid needs to be conserved, or when a back-up is required for when liquid EGR is not present, external EGR system may be added.

While not shown, it will be appreciated that engine may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system. Controller 12 may also receive an operator request for windshield wiping via a dedicated sensor (not shown). In response to the signals received from the various sensors, the controller may operate various engine actuators. Example actuators include fuel injector 166, wiper motor 72, wiper injector 74, throttle 162, cams 151 and 153, etc.

Storage medium read-only memory 110 can be programmed with computer readable data representing instructions executable by processor 106 for performing the methods described below as well as other variants that are anticipated but not specifically listed. An example routine that may be performed is elaborated with reference to FIG. 2.

In this way, the system of FIG. 1 is configured to store a fluid including one or more non-ionic surfactants in a reservoir coupled to a cylinder direct injector, and deliver the fluid from the reservoir to each of the cylinder and a vehicle windshield. For example, in response to knock, the controller may direct inject the fluid including one or more non-ionic surfactants into the cylinder from the reservoir coupled to the direct injector. Then, in response to operator demand, the controller may deliver the fluid from the reservoir to the vehicle windshield. This enables dual use of the windshield wiper fluid without degrading engine performance.

Figure 2:
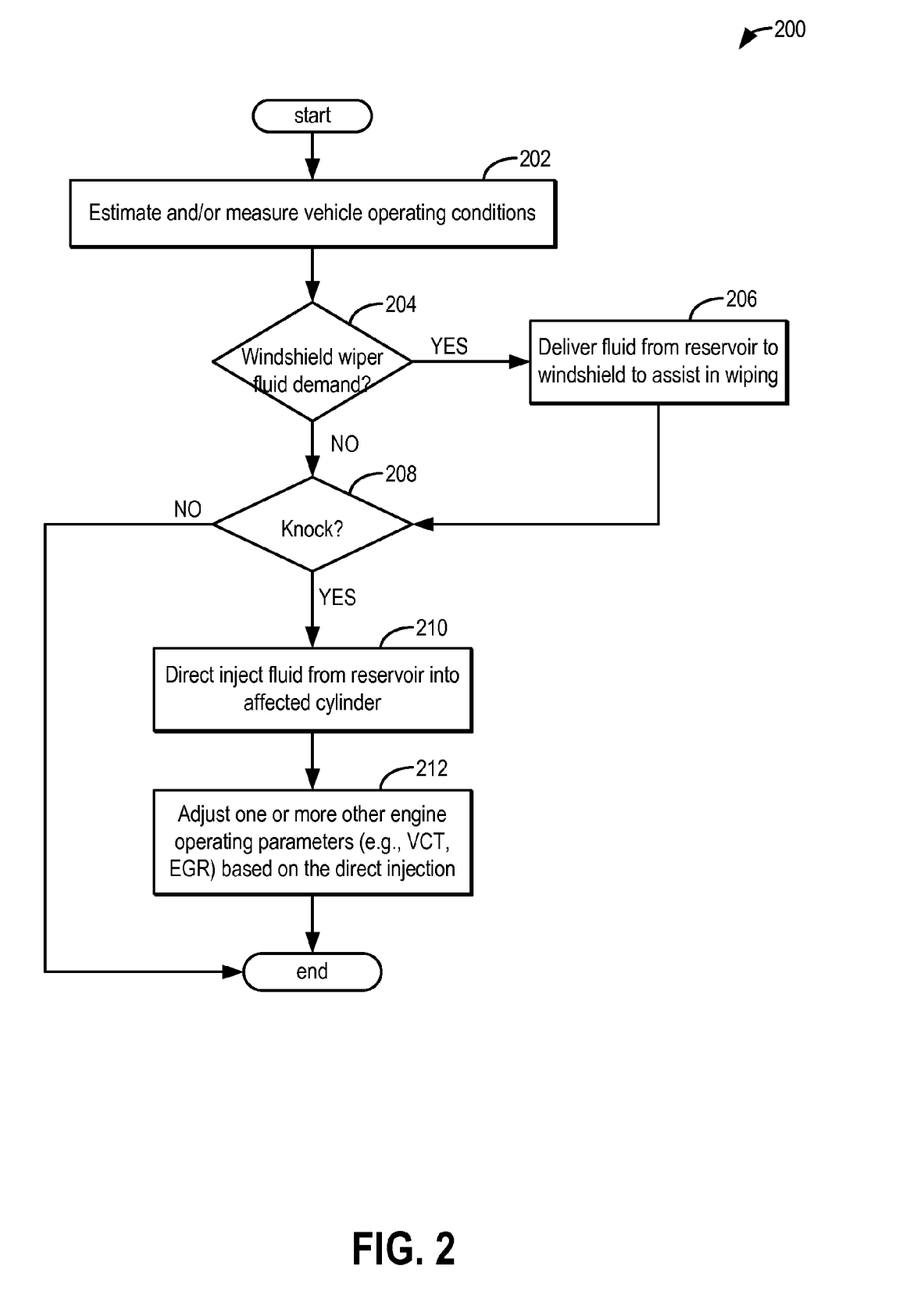
FIG. 2 shows a high level flow chart illustrating a routine that may be implemented for delivering windshield wiper fluid to each of an engine combustion chamber and a vehicle windshield.
Figure 3A:
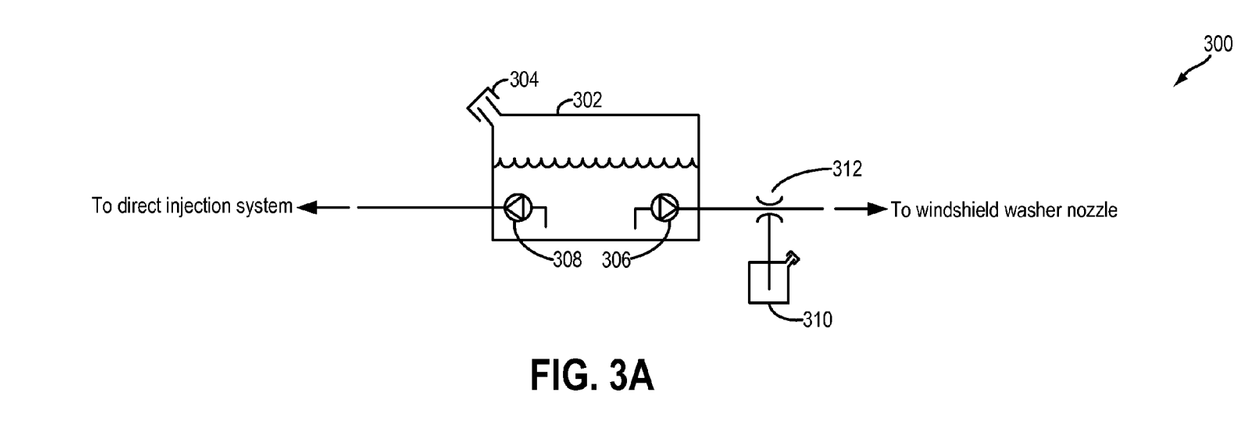
FIGS. 3A-B depict example embodiments of a windshield wiper fluid delivery system coupled to the vehicle system of FIG. 1.
Figure 3B:
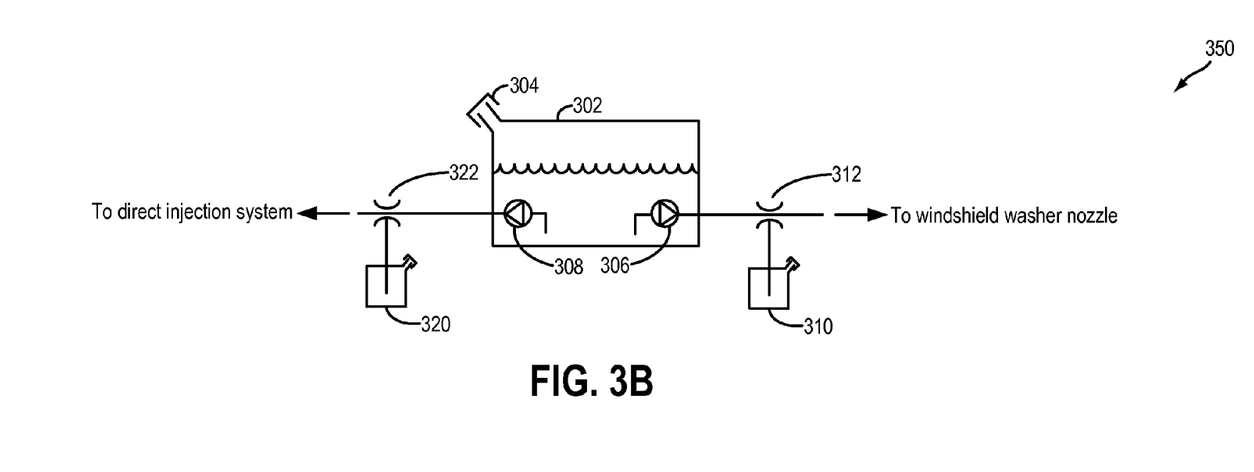

Now turning to FIG. 2, routine 200 describes an example method for delivering the reformulated wiper fluid from a dedicated reservoir to the windshield to meet windshield wiping demand and/or to a combustion chamber in response to an indication of knock. By using a windshield wiper fluid with non-ionic components, both functions are enabled with reduced risk of engine contamination or corrosion.

At 202, the routine includes estimating and/or inferring vehicle operating conditions. These may include various vehicle conditions, such as vehicle speed, as well as various engine operating conditions, such as engine speed, engine temperature, boost level, MAP, MAF, torque demand, etc. At 204, the routine includes determining if there is any demand for windshield wiper fluid. For example, it may be determined if a vehicle operator has requested windshield wiper be injected onto the windshield. In another example, it may be determined if the vehicle operator has requested windshield wiping. At 206, in response to operator demand, the routine includes delivering the wiper fluid from the reservoir where it is stored to the vehicle windshield, and applying them on the windshield. Herein, the one or more non-ionic surfactants included in the wiper fluid may lubricate the wiper blade allowing the wiper to smoothly sweep the windshield. In addition, the non-ionic components may enhance cleaning of the windshield by enabling agglomeration of dirt particles on the windshield. Delivering the fluid in response to operator demand may include delivering a fixed amount of the fluid to the vehicle windshield. In one example, the fixed amount may be based on a pulse width of a wiper fluid injector coupled to the vehicle windshield.

In some embodiments, the windshield wiper system may include an aspirator. In those embodiments, delivering the fluid from the reservoir to the vehicle windshield may includes flowing the fluid from the reservoir to the windshield through the aspirator. Vacuum generated via the fluid flow may then be drawn at the neck of the aspirator and stored in a vacuum reservoir for later use. This allows the flow of windshield wiper fluid to be advantageously used for vacuum production.

In some embodiments, the wiper fluid may be generated or modified (in situ) in response to the wiping demand. As an example, reservoir 76 may store a surfactant-free version of the fluid. Then, in response to the wiping demand, one or more non-ionic surfactants may be added to the fluid before delivery to the windshield. In an alternate example, reservoir 76 may store a wiper fluid including a first set of non-ionic surfactants. Then, in response to the wiping demand, one or more additional non-ionic surfactants may be added to the fluid before delivery to the windshield.

If there is no demand for windshield wiping at 204, or after windshield wiping demand are met at 206, the routine proceeds to 208 where it is determined if there is an indication of knock. In one example, an indication of knock may be determined based on the output of a knock sensor coupled to the engine block. Based on the intensity of the knock, as well as a timing of the knock (e.g., in crank angle degrees), the affected cylinder may be identified. In addition, based on the intensity of the knock, an amount of engine dilution required to address the knock may be determined. If no knock is determined, the routine may end.

If knock is confirmed, then at 210, the routine includes direct injecting the wiper fluid including the one or more non-ionic surfactants into the affected cylinder from the reservoir. As such, the reservoir may be coupled to the direct injector. Direct injecting the fluid in response to knock may include direct injecting a variable amount of the fluid, the amount varied based on an intensity of the knock indication. For example, as the knock intensity increases, the amount of fluid direct injected into the affected cylinder may be increased.

In some embodiments, the wiper fluid may be generated or modified (in situ) in response to the demand for knock control. As an example, reservoir 76 may store a surfactant-free version of the fluid. Then, in response to the indication of knock, one or more non-ionic surfactants and/or a lubricant may be added to the fluid before direct injection into the cylinder. In an alternate example, reservoir 76 may store a wiper fluid including a first set of non-ionic surfactants. Then, in response to the indication of knock, one or more additional non-ionic surfactants and/or a lubricant may be added to the fluid before direct injection into the cylinder. Herein, the lubricant may be an engine valve lubricant. By adding a lubricant to fluid headed to the engine, valve recession can be reduced, in particular at high engine speed/load conditions.

In some embodiments, if knock is determined, it may be further determined if valve recessions is likely. If conditions are such that the valves are likely to recede, a valve recession retardant can be dosed into the direct injection system. That is, the routine may include direct injecting the wiper fluid including a valve recession retardant into the affected cylinder from the reservoir. As such, since conditions for knock and potential valve recession may largely overlap, by adjusting the composition of wiper fluid direct injected into the cylinder based on knock issues and valve recessions issues, each of knock and valve recession can be concomitantly addressed.

At 212, one or more engine operating parameters may be adjusted based on the cylinder direct injection. These may include, for example, adjustments to VCT, throttle opening, and EGR amounts, based on the knock control fluid injection to provide a desired engine dilution. Specifically, based at least on the dilution effect of the injected washer fluid, an amount of engine dilution provided by the injection may be determined, and a corresponding EGR and VCT adjustment may be performed. As an example, when the injected fluid has a higher dilution effect, the amount of EGR may be decreased. In comparison, when the injected fuel has a higher dilution effect, the amount of EGR may be maintained or increased.

In this way, a fluid including one or more non-ionic surfactants may be stored in a reservoir coupled to a cylinder direct injector and delivered from the reservoir to each of a knock-affected cylinder and a vehicle windshield. By delivering the same fluid including non-ionic surfactants to the knock-affected cylinder in response to an indication of knock, and to meet wiping demands as requested by a vehicle operator, knock can be addressed without degrading the engine while also cleaning the windshield.

In one example, a vehicle system comprises a vehicle windshield including wipers for wiping the windshield, an engine including a cylinder, a direct injector configured to direct inject a fluid into the cylinder, and a first reservoir coupled to the direct injector and further coupled to the windshield, the reservoir configured to store the fluid, the fluid including one or more non-ionic surfactants. Herein, the bulk of the liquid is an alcohol solution that is modified as required for its specific use: windshield washing, windshield de-icing, injection system internal conditioning, and valve recession prevention. A controller may be configured with computer readable instructions for, in response to operator windshield wiping demand, delivering fluid from the reservoir to the windshield. Further, in response to an indication of knock, the controller may deliver fluid from the reservoir to the cylinder via the direct injector. The system may further comprise a second reservoir coupled to the first reservoir, the second reservoir storing a surfactant-free aqueous solution. The controller may mix the surfactant-free aqueous solution with the one or more non-ionic surfactants to generate the fluid in the first reservoir. Alternatively, the second reservoir may store an ionic aqueous solution, and the controller may remove an electrolyte from the ionic aqueous solution to generate the fluid in the first reservoir. Further still, when delivering fluid from the reservoir to the cylinder via the direct injector, the fluid may be mixed with a lubricant before the direct injection, in particular at high engine speed-load conditions. The system may further comprise an aspirator such that fluid is delivered from the reservoir to the windshield via the aspirator. Vacuum drawn at a neck of the aspirator is then stored in a vacuum reservoir.

In this way, a windshield wiper fluid may be reformulated to include one or more non-ionic surfactants while excluding ionic and reactive materials. By replacing the reactive components of the fluid with organic buffers and non-ionic components, the washer fluid can be used to clean the windshield. At the same time, by delivering the fuel to an engine cylinder in response to an indication of cylinder knock, the same fluid may be direct injected to increase engine dilution and reduce knock while reducing the risk of engine contamination and corrosion. Overall engine performance is improved and the life of exhaust components is prolonged.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising,
in response to knock, direct injecting a fluid including one or more non-ionic surfactants into a cylinder from a first reservoir; and
in response to operator demand, delivering the fluid from the first reservoir to a vehicle windshield while mixing a second fluid from a second reservoir with the first fluid via an aspirator, the second fluid being a concentrated aqueous liquid with ionic surfactants.

2. The method of claim 1, wherein the fluid is non-electrolytic, non-corrosive aqueous fluid, and wherein the first reservoir is coupled to a cylinder direct injector.

3. The method of claim 1, wherein the one or more non-ionic surfactants include Triton-X-100 and Nonoxynol-9.

4. The method of claim 1, wherein direct injecting the fluid in response to knock includes direct injecting a variable amount of the fluid, the amount varied based on an intensity of the knock indication.

5. The method of claim 4, wherein delivering the fluid in response to operator demand includes delivering a fixed amount of the fluid to the vehicle windshield.

6. The method of claim 5, wherein the fixed amount is based on a pulse width of an injector coupled to the vehicle windshield.

7. The method of claim 1, wherein delivering the fluid from the first reservoir to the vehicle windshield includes flowing the fluid from the first reservoir to the windshield through the aspirator, the method further comprising, drawing vacuum from a neck of the aspirator, the vacuum generated via the fluid flow.

8. The method of claim 7, further comprising, mixing the first fluid with a lubricant before direct injecting the first fluid into the cylinder.

9. The method of claim 1, wherein the fluid is a first aqueous liquid, the engine further including the second reservoir coupled to the first reservoir, the second reservoir storing a second aqueous liquid, the method further comprising, removing an electrolyte from the second aqueous liquid to generate the first aqueous liquid.

10. A method for an engine, comprising:
storing a surfactant-free water-alcohol fluid in a reservoir
mixing the fluid with a lubricant stored in a second reservoir via a first aspirator and delivering a first mixture to an engine cylinder via a first pump; and
mixing the fluid with a non-ionic surfactant stored in a third reservoir via a second aspirator and delivering a second mixture to a windshield via a second pump.

11. The method of claim 10, wherein delivering to the cylinder includes direct injecting to the cylinder in response to an indication of knock, the indication based on a knock sensor.

12. The method of claim 11, wherein delivering the second mixture to the windshield includes delivering in response to an operator demand.

13. A vehicle system, comprising:
a vehicle windshield including wipers for wiping the windshield;
an engine including a cylinder;
a direct injector configured to direct inject a fluid into the cylinder;
a first reservoir coupled to the direct injector and further coupled to the windshield, the reservoir configured to store the fluid, the fluid including one or more non-ionic surfactants;
a second reservoir coupled to the first reservoir, the second reservoir storing an ionic aqueous solution; and
a controller with computer readable instructions stored in memory for,
in response to operator windshield wiping demand, delivering fluid from the reservoir to the windshield; and
in response to an indication of knock, delivering fluid from the reservoir to the cylinder via the direct injector, wherein the controller includes further instructions for removing an electrolyte from the ionic aqueous solution to generate the fluid in the first reservoir.

14. The system of claim 13, further comprising an aspirator, wherein the controller includes further instructions for delivering fluid from the reservoir to the windshield via the aspirator, and storing vacuum drawn at a neck of the aspirator in a vacuum reservoir.

15. The system of claim 13, wherein delivering fluid from the reservoir to the cylinder via the direct injector includes mixing the fluid with a lubricant before direct injecting the fluid.

16. The system of claim 15, further comprising the second reservoir coupled to the first reservoir, the second reservoir storing the lubricant, and wherein mixing the fluid with the lubricant before direct injecting the fluid includes mixing a metered amount of lubricant with the fluid in the first reservoir before direct injecting the fluid, the metered amount of lubricant based on a degree of cylinder valve recession.

17. The system of claim 13, further comprising the second reservoir coupled to the first reservoir, the second reservoir storing the ionic aqueous solution, wherein the controller includes further instructions for mixing an amount of the ionic aqueous solution with the fluid in the first reservoir, and delivering the mixture to the windshield in response to an operator request for windshield de-icing.

* * * * *